US005430233A

United States Patent [19]

Forrester

[11] Patent Number: 5,430,233

[45] Date of Patent: Jul. 4, 1995

[54] IMMOBILIZATION OF LEAD IN SOLID RESIDUES FROM RECLAIMING METALS

[75] Inventor: Keith E. Forrester, Stratham, N.H.

[73] Assignee: Wheelabrator Environmental Systems, Inc., Hampton, N.H.

[21] Appl. No.: 673,825

[22] Filed: Mar. 22, 1991

[51] Int. Cl.[6] .................... C01B 25/37; C01G 21/00; A62D 3/00

[52] U.S. Cl. .................... 588/236; 423/89; 423/305; 423/659; 423/DIG. 18

[58] Field of Search ......... 423/305, 89, 659, DIG. 20, 423/DIG. 18; 588/236

[56] References Cited

U.S. PATENT DOCUMENTS

| | | | |
|---|---|---|---|
| 4,671,882 | 6/1987 | Douglas et al. | 210/720 |
| 4,737,356 | 4/1988 | O'Hara et al. | 423/659 |
| 4,950,409 | 8/1990 | Stanforth | 210/751 |
| 4,975,115 | 12/1990 | Irons | 75/330 |
| 5,127,963 | 7/1992 | Hartup et al. | 134/26 |
| 5,162,600 | 11/1992 | Cody et al. | 588/236 |
| 5,193,936 | 3/1993 | Pal et al. | 405/128 |
| 5,245,114 | 9/1993 | Forrester | 588/236 |

FOREIGN PATENT DOCUMENTS

| | | | |
|---|---|---|---|
| 9216262 | 10/1992 | WIPO | 588/236 |

OTHER PUBLICATIONS

Sullivan, "Recycling Scrap Wire and Cable: The State of the Art", Spring Mtg. of the Nonferrous/Electrical div. of the Wire Assn. Intnl., May 1985.

*Primary Examiner*—John Zimmerman
*Assistant Examiner*—Timothy C. Vanoy
*Attorney, Agent, or Firm*—Banner, Birch, McKie & Beckett

[57] ABSTRACT

Solid residues arising from the reclamation of metal from, for example, insulated wires and automobiles, have lead (Pb) sufficiently insolubilized to pass the EPA toxicity test. Addition of water soluble phosphate, especially phosphoric acid, increases the immobilization of lead (Pb) so as to make such residues in compliance with the toxicity tests over a substantially broader pH range, particularly with respect to the more stringent TCLP extraction test.

17 Claims, 1 Drawing Sheet

COPPER WIRE INSULATION PROCESS IMMOBILIZATION

COPPER WIRE INSULATION PROCESS IMMOBILIZATION

IMMOBILIZATION OF LEAD IN SOLID RESIDUES FROM RECLAIMING METALS

FIELD OF THE INVENTION

This is invention relates to a method for immobilizing lead in solid residues, and more particularly immobilizing lead contained in solid wastes from the reclamation of metal from, for example, insulated wires and automobiles.

BACKGROUND OF THE INVENTION

For years there has been interest in recovering thermoplastic insulation materials for reuse by plastic molders and extruders. However, the scrap plastic insulation materials are typically not up to the quality of virgin thermoplastic materials. As such, such material has not gained much acceptance for use in lieu of virgin thermoplastic materials because of the difference in quality and also the difference in price.

In the present spirit of wishing to recycle all useful products in lieu of consuming non-renewable mineral ores, there has been an upsurge in the reclamation of such mineral ores such as copper and aluminum from insulated wire. A by-product of such a reclamation procedure is the wire insulation itself. As noted earlier, such recycled insulation materials are not high demand. Thus, the recycling of copper and aluminum wire, for example, is currently plagued with the problem that arises from the need to dispose of the shredder residue and dust i.e., the wire plastic coatings and other natural casings and housing as well as residual wire cuttings and fines which are produced as a waste product off of the wire recycling equipment. The wire reclamation solid waste is currently either managed as a solid or a hazardous waste depending on the lead (Pb) leachability as revealed by the Extraction Procedure Toxicity (EPT) or Toxicity Characteristics Leaching Procedure (TCLP) extraction test defined by the Resource Conservation and Recovery Act (RCRA). The TCLP extraction test predicts the effect of decomposing organic material in a landfill on wastes being considered for landfill waste disposal. When organic material decomposes, acetic acid is formed. Thus, in the TCLP extraction test, both water and acetic acid are used to extract leachable heavy metals, such as lead, from the waste, which are then quantified. Most such solid waste currently fails the TCLP regulatory limit of 5.0 ppm for lead and thus is currently considered a hazardous waste in the United States. Likewise scrap, including plastics and filter dust, from automobile shredder operations to reclaim metals in the Netherlands has been declared hazardous by the government due to possible heavy metal contamination.

Thus, there is a need for a method to safely dispose of shredder residues and filter dust, including reclaimed wire insulation and fluff and automobile shredder residues, or to render it safe for disposal without concern of leaching of heavy metals such as lead.

The environmental hazard of shredder residues and filter dust from which leachable amounts of lead greater than the toxic levels specified by the Environmental Protection Agency (EPA) could be somewhat diminished by mixing such residues and dust with other types of residues not containing lead, such that the resulting mixture is within the toxic levels for lead. However, such a practice is not allowed by the EPA, i.e., hazardous wastes cannot be mixed with non-hazardous wastes to dilute the levels of lead below toxic levels. Thus, it is highly desirable to reduce the amount of lead leached from such waste material and other solid waste containing leachable lead to an amount below the toxic level specified by the EPA. The invention herein is a solution to this problem. More specifically, it is a method of treating solid waste materials, such as shredder residues and filter dust and mixtures containing such solid waste materials, so as to reduce the amounts of lead leached therefrom to a level below the toxic level specified by the EPA. Stated differently, the invention herein is a method of immobilizing, or insolubilizing, lead in solid waste produced by metal reclamation processes. The method is convenient, quite simple, very efficient, applicable over a wide pH range, and relatively low cost. An important advantage of the method of the present invention is that the method can be performed in a totally "enclosed" environment, thereby exempting the practice of the present invention in this manner from RCRA Part B permitting. The method is, therefore, commercially extraordinarily attractive as well being environmentally beneficial.

SUMMARY OF THE INVENTION

Accordingly, the purpose of this invention is to increase the immobilization of lead in solid wastes produced by metal reclamation processes, for example, wire recycling processes and automobile shredder operations. In one embodiment, the metal reclamation solid waste is treated with an effective amount of a source of water soluble phosphate to insolubilize leachable, soluble lead species to below regulatory limits. In a more specific embodiment, the water soluble phosphate is added in an amount equivalent to from about 0.01% to about 15%, preferably from about 1 to about 15% and more preferably from about 1 to about 5%, by weight of phosphoric acid based on the total residue (solid wastes). In an alternate embodiment, the water soluble phosphate is added in an amount equivalent to from about 0.01% to less than 1%, preferably from about 0.1% to less than 1%, by weight of phosphoric acid based on the total residue (solid wastes). The solid waste may be treated by a wet or dry application of the phosphates thereto in order to convert the soluble lead species into insoluble phosphate-lead compounds that would not leach significantly under the EPT/TCLP test procedures. If a dry application of the phosphates is used, the soluble lead species in the treated solid waste would be rendered insoluble in situ, i.e., in the landfill, by water, e.g., rain water, percolating through the landfill, solubilizing the phosphate and thereby insolubilizing the soluble lead species thereof. The application of the water soluble phosphate may be at any convenient point after solid residue or waste production preferably prior to exiting the metal reclamation process, for example, the application of the phosphates into existing pneumatic and/or screw conveyors which convey reclaimed wire insulation and wire fluff in a connected and preferably in an enclosed fashion from wire separation equipment.

DESCRIPTION OF THE INVENTION

Figure 1:
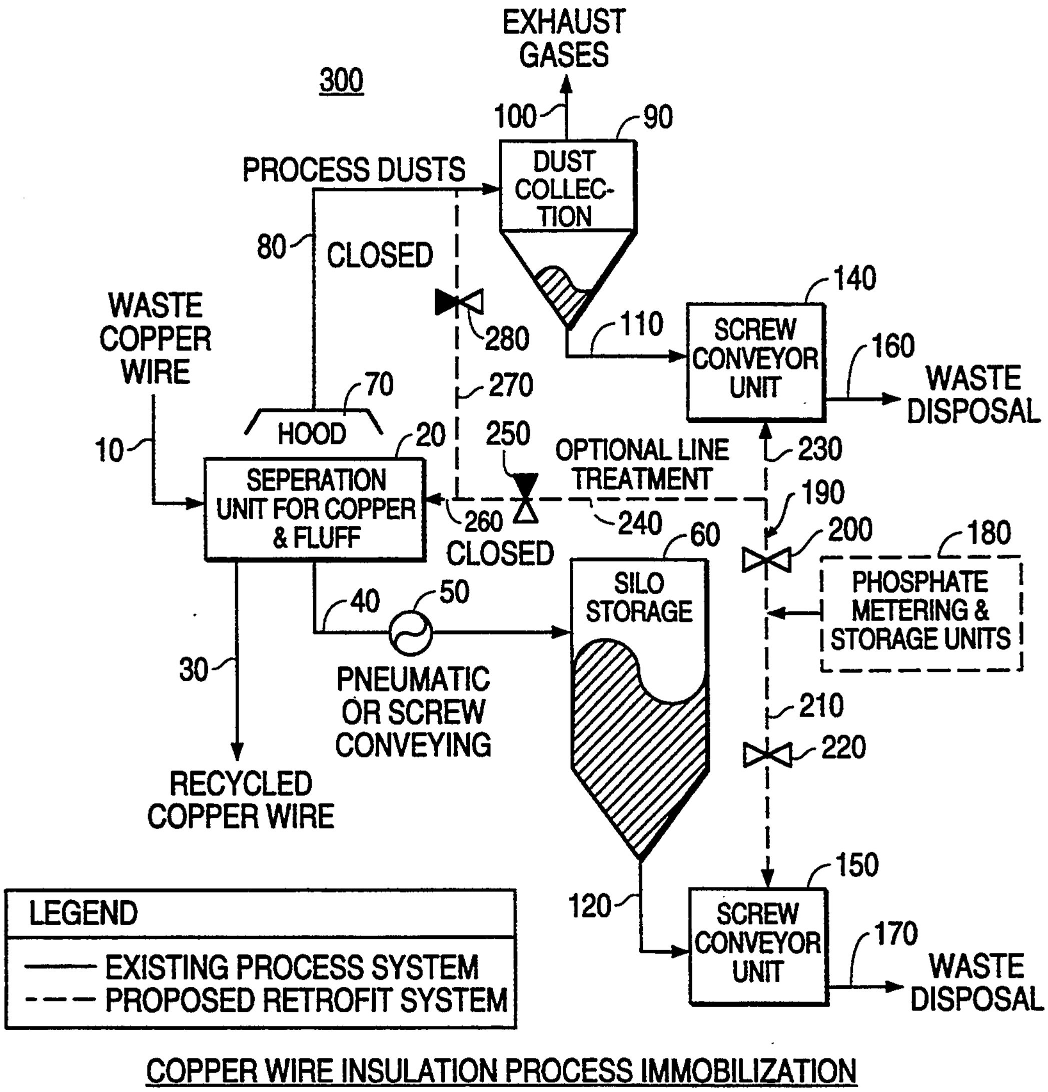
FIG. 1 shows an embodiment of the present invention in process schematic fashion showing a modification to existing pneumatic and/or screw conveyors which convey reclaimed wire insulation and wire fluff in a connected and enclosed fashion from the wire separation equipment to allow the application of the water soluble phosphates therein to these solid wastes.

The solid wastes being treated in the present invention are solid wastes produced by metal reclamation processes, for example, reclaimed insulation products and wire fluff from the reclamation of metal wire, generally from commercial wire-chopping operations, and automobile shredder residues and filter dust. Such solid wastes contain lead which can be leached at levels in excess of 5 ppm, as determined by an EPA test, particularly the more stringent TCLP extraction test. The initial physical character of such solids are a free flowing particulate and/or fibrous mass, and a virtue of the present invention is that after treatment to immobilize lead the solid wastes retain their initial physical character, even after water percolation, which is important in the handling thereof, i.e., no need to change handling equipment in part because the weight or density of the solid waste has not been significantly increased. In one variant of the present invention, the solid waste treated is a mixture of solid wastes produced by metal reclamation processes and another solid residue, for example bottom ash, usually containing up to about 25% by weight of metal reclamation solid waste, preferably between 2 and about 25% metal reclamation solid waste and more preferably between 5 and 20% metal reclamation solid waste. The following description of the present invention is couched in terms of reclaimed wire insulation and wire fluff only. This corresponds to a convenient way of carrying out the present invention, but the choice of this particular description is for expository convenience only. It is to be clearly understood that variants such as use of other metal reclamation solid wastes, treatment of a mixture of such solid wastes with other solid residues or independently treating such solid wastes and then combining it with another inert solid residue are intended to be subsumed under the present invention as claimed, as are other premutations which one skilled in the art will recognize.

Processes for reclaiming metals, for example, from insulated wire, are well known to those skilled in the art. See, for example, the description given by J. F. Sullivan in his article "Recycling Scrap Wire and Cable: The State of the Art", Wire Journal International (1990). Typically, such a process includes the following unit operations. Initially, the scrap insulated wire is placed onto conveyors for delivery to a primary granulator. The primary granulator is the first reduction stage in the process. The primary granulator usually contains a solid alloy steel rotor having a plurality of deep lobes equally spaced about at the perimeter of the rotor. "Fly" knives are then bolted to these lobes. These knives cut against a pair of stationary knives mounted on opposite sides of the chamber containing the rotor. Underneath, close to the swept circumference of the rotor blades is a perforated grate with apertures sized to allow the passage of wire up to about three inches in length. Stripping of insulation is only partially accomplished in the primary granulator, whose purpose is to prepare the wire for further reduction in the secondary stage. The second reduction stage granulator is equipped with a plurality of knives on a solid rotor and a grate with smaller openings to produce lengths of about $\frac{1}{4}$ inch maximum. Here the stripping of insulation is mostly completed and the mixture is ready for separation. Thereafter, the cut material is sent to a vibrating screen. The purpose of this screening is to size the wire granule by its smallest dimension. High-speed horizontal vibrating screens have been found to be most sufficient in this regard. Two sized fractions are made on a two-deck screen; a course fraction retained on the top screen. Fines passing through the lower screen are copper powder and some dirt, fiber and plastic dust. These are passed through a current of air to remove the dust and directly to product.

Thereafter, referring now to FIG. 1, the waste copper wire materials 10 are sent to a specific gravity separator 20. The specific gravity separator is typically in the form of a device called an air table. The air table 20 supplies low-pressure air through a porous medium to fluidize the material bed and then separates the fractions of different density through combination of vibration and gravity flows induced by sloping and separating surfaces in two planes. The air table 20 discharges a stream of clean finished copper granules noted in FIG. 1 as recycled cycled copper wire 30. The plastic material 40 from the wire insulation is taken from the air table 20 via a pneumatic or screw conveyor 50 to a silo storage 60. A hood 70 is provided on the air table 20 for the collection of process dusts 80 also known as wire fluff in this case and is sent to a dust collection piece of equipment 90, which has exhaust gases 100. Screw conveyor units 150 and 140 are provided to take the reclaimed insulation 120 and the wire fluff 110, respectively, to waste disposal 170 and 160, respectively.

As shown in FIG. 1, the existing separation equipment 300 can be modified to incorporate storage units for a source of water soluble phosphate and metering identified as box 180 in FIG. 1 and valving 200, 220 and piping 210, 230 to accommodate the application of the water soluble phosphate preferably to the screw conveyor units 150 and 140 conveying the reclaimed wire insulation 120 and wire fluff 110, respectively. Optionally, the source of water soluble phosphate can also be applied to the material on the air table 20 and/or to the inlet of the dust collector 90 via valving 250 and 280 and piping 240, 260 and 270.

As shown in FIG. 1, the reclaimed wire insulation 120 and wire fluff 110 may each be treated independently with a source of water soluble phosphate to immobilize lead therein. It is, perhaps, most convenient merely to spray the mixture with the phosphate source thereon and then agitate the mixture to ensure the dispersion of the phosphate. However, merely dispersing a good source of water soluble phosphate through the mixture also may be performed, although not necessarily with equivalent results.

Any convenient source of water soluble phosphate may be used in the practice of this invention. The solid waste may be treated by a wet or dry application of the phosphate thereto. If a dry application of the phosphates is used, the soluble lead species in the treated solid waste would be rendered insoluble in situ, i.e., in the landfill, by water, e.g., rain water, percolating through the landfill, solubilizing the phosphate and thereby insolubilizing the soluble lead species thereof. Wet or dry application can be accomplished by any convenient means, for example, pneumatic injection (dry application) and spraying (wet application). By a water soluble phosphate it is meant a phosphate soluble in water at about 20° C. at least to the extent of about 5 weight-volume percent. Phosphoric acids including orthophosphoric acid, hypophosphoric acid, metaphosphoric acid and pyrophosphoric acid, can be conveniently used in this invention. Sometimes it is desirable to use a less acidic source of phosphate. Other less acidic sources of phosphates include: phosphate, monohydrogen phosphate, and dihydrogen phosphate salts, such as trisodium phosphate, disodium hydrogen phosphate, sodium dihydrogen phosphate, potassium phosphate, dipotassium hydrogen phosphate, potassium dihydrogen phosphate, lithium phosphate, lithium hydrogen phosphate and lithium dihydrogen phosphate. Quite generally, the salts of the various phosphoric acids may be utilized, and among these the alkali metal salts are most frequently employed.

The amount of water soluble phosphates source to be added to the metal reclamation solid waste, such as reclaimed wire insulation and/or wire fluff, or other solid residues containing such solid waste to ensure adequate immobilization of lead will be depend on such variables as the alkalinity of the metal reclamation solid waste and/or any other solid residue that may be present its buffering capability, the amount of lead initially present, and so on. It has been found that an amount of the water soluble phosphate source equivalent to between about 5% and about 15% by weight of phosphoric acid, $H_3PO_4$, based on a total solid residue is sufficient. For that matter, since an amount of the water soluble phosphate equivalent to about 5% by weight of phosphoric acid worked so well, it is believed that an amount of the water soluble phosphate source equivalent to between about 0.01% and about 5% by weight of phosphoric acid, $H_3PO_4$, based on a total solid waste should be sufficient, preferably from 0.1% to less than 1% by weight. However, the foregoing is not intended to preclude yet higher usage of a water soluble phosphate if needed since it has been demonstrated that amounts greater than 5% by weight also work, but are more costly.

The examples below are merely illustrative of this invention and are not intended to limit it thereby in any way.

EXAMPLE

In this example, reclaimed wire insulation was treated with varying amounts of phosphoric acid. The samples of treated reclaimed wire insulation were then extracted according to TCLP procedure set forth in Federal Register, Vol. 55, No. 126, pp. 26985–26998 (Jun. 29, 1990), which is hereby incorporated by reference. This test procedure is also referenced in 40 Code of Federal Regulations §260 (Appendix 2) and EPA SW 846, 3rd Edition. The retained leachate was digested prior to analysis by atomic absorption spectrophotometry.

A gross sample of the reclaimed insulation was split into four samples of 100 grams each. Duplicates of each sample were also prepared for testing reproducibility. Thereafter, reagents were added using a wide T-Jet or wide dispersing spray pattern into the samples while in the Kitchen Aide Mixer under the matrix approach shown in Table 1.

TABLE 1

| Sample | Dry Weight | Distilled $H_2O$ | 75% $H_3PO_4$ | Mixing Speed/Time |
|---|---|---|---|---|
| 1 | 100 gm | 15 gm | 0 gm | medium/5 min. |
| 2 | 100 gm | 14 gm | 5 gm | medium/5 min. |
| 3 | 100 gm | 12 gm | 10 gm | medium/5 min. |
| 4 | 100 gm | 10 gm | 15 gm | medium/5 min. |

Each sample was then tested to see what extraction fluid should be selected for the TCLP test procedure. For each sample, a 5 gram portion of the sample was stirred along with 96.5 milliliters of deionized water. The pH at the end of five minutes was then recorded. In the case of sample no. 1, 3.5 milliliters 1.0N HCl was added and the mixture was then heated to 50° C. for five minutes. Upon cooling, the pH was then recorded and used as a basis for extraction fluid selection. Each sample was tested twice to verify the selection of extraction fluid. The pH's for each of the samples are noted in Table 2.

TABLE 2

| Sample | | Extraction Fluid Selection, pH (1st Test, 2nd Test) |
|---|---|---|
| 1 | w/deionized $H_2O$ | 5.79, 5.79 |
| | then adding HCl | 1.53, 1.53 |
| 2 | w/deionized $H_2O$ | 3.05, 3.05 |
| 3 | w/deionized $H_2O$ | 2.24, 2.24 |
| 4 | w/deionized $H_2O$ | 2.23, 2.23 |

On the basis of the foregoing, Extraction Fluid No. 1 was selected. Extraction Fluid No. 1 consists of 0.57% by volume glacial acetic acid to which 0.1N NaOH has been added to yield a pH of $4.93 \pm 0.05$.

Since each of the samples contained no free liquid, the respective sample was not filtered before extraction. 75 grams of the respective sample was added to the extractor with 1500 milliliters of Extraction Fluid No. 1. The extraction time was eighteen hours and the final pH is recorded in Table 3. The extract was analyzed for lead and the amount detected also shown in Table 3 along with the regulatory limit for lead.

TABLE 3

| | | Lead (mg/L) | |
|---|---|---|---|
| Sample[a] | Final pH | TCLP Value | Regulatory Limit |
| 1 | 4.95, 4.97 | 11, 11 | 5.0 |
| 2 | 4.87, 4.88 | F 0.5, F 0.5 | 5.0 |
| 3 | 4.66, 4.68 | F 0.5, F 0.5 | 5.0 |
| 4 | 4.59, 4.60 | F 0.5, F 0.5 | 5.0 |

[a]Final pH and TCLP value are given for 1st test, 2nd test.

The foregoing results in Table 3 readily established the operability of the present process to immobilize leachable, soluble lead in the solid waste generated by metal reclamation processes. The effectiveness of the water soluble phosphate to insolubilize lead by the addition of 5 grams of 75% phosphoric acid to 100 grams of reclaimed wire insulation, it is believed that an amount of the water soluble phosphate equivalent to less than 1% by weight of phosphoric acid should be effective to immobilize lead in the solid waste produced by metal reclamation processes on down to about 0.1% by weight and, even down to about 0.01% by weight based on a total solid waste.

It will be apparent from foregoing that many other variations and modifications may be made in the methods and the compositions herein before described, by those having experience in this technology, without departing from the concept of the present invention. Accordingly, it should be clearly understood that the methods and compositions referred to herein in the foregoing description are illustrative only and are not intended to have any limitation on the scope of the invention.

What is claimed is:

1. A method of immobilizing lead in a free flowing particulate or fibrous dry solid residue which maintains its free flowing particulate or fibrous nature after the immobilizing treatment wherein said dry solid residue solid waste from metal reclamation processes contains reclaimed wire insulation, reclaimed wire fluff, plastic dust from wire reclamation or plastic from automobile shredding operations, said method comprising:

contacting said dry solid residue with an amount of at least one water soluble phosphate that is effective to reduce the leaching of lead from said dry solid residue to a level no more than 5 ppm lead as determined in an EPA TCLP test performed on the resulting treated residue as set forth in the Federal Register, vol. 55, no. 126, pp. 26985–26998 (Jun. 29, 1990) wherein said solid residue maintains its free flowing particulate or fibrous nature.

2. The method of claim 1, wherein the dry solid residue contains up to about 25% by weight solid waste from metal reclamation processes.

3. The method of claim 1, wherein the dry solid residue contains from about 2 to about 25% by weight solid waste from metal reclamation processes.

4. The method of claim 1, wherein the dry solid residue contains from about 5 to 20% by weight of solid waste from metal reclamation processes.

5. The method of claim 1, wherein the water soluble phosphate is selected from the group consisting of phosphoric acid, polyphosphoric acid, hypophosphoric acid, metaphosphoric acid, salts thereof.

6. The method of claim 5, wherein the salts are alkali metal salts.

7. The method of claim 6, wherein the salt is a trisodium phosphate, disodium hydrogen phosphate, sodium dihydrogen phosphate, tripotassium phosphate, dipotassum hydrogen phosphate, potassium dihydrogen phosphate, trilithium phosphate, dilithium hydrogen phosphate, lithium dihydrogen phosphate or mixtures thereof.

8. The method of claim 5, wherein the water soluble phosphate is phosphoric acid.

9. The method of claim 1, wherein the dry solid residue is contacted with at least one water soluble phosphate in an amount equivalent to about 0.01 to about 15% by weight of phosphoric acid based on the total residue.

10. The method of claim 1, wherein the dry solid residue is contacted with at least one water soluble phosphate in an amount equivalent to about 1 to about 15% by weight of phosphoric acid based on the total residue.

11. The method of claim 1, wherein the dry solid residue is contacted with at least one water soluble phosphate in an amount equivalent to about 1 to about 5% by weight of phosphoric acid based on the total residue.

12. The method of claim 1, wherein the dry solid residue is contacted with at least one water soluble phosphate in an amount equivalent to about 0.01 to less than 1% by weight of phosphoric acid based on the total residue.

13. The method of claim 1, wherein the dry solid residue is contacted with at least one water soluble phosphate in an amount equivalent to about 0.1 to less than 1% by weight of phosphoric acid based on the total residue.

14. The method of claim 1, when said contacting is performed in an enclosed environment.

15. A method as in claim 1 wherein the contacting step comprises contacting reclaimed wire insulation with said at least one water soluble phosphate in an amount equivalent to about 1 wt % to about 15 wt % phosphoric acid based on the total residue.

16. A method as in claim 1 wherein the contacting step comprises contacting reclaimed wire fluff with said at least one water soluble phosphate in an amount equivalent to about 1 wt % to about 15 wt % phosphoric acid based on the total residue.

17. A method as in claim 1 wherein the contacting step comprises:

applying a dry form of said at least one water soluble phosphate to said dry solid residue to form a treated solid residue; and insolubilizing the soluble lead species in the treated solid residue in situ in a landfill by contacting said treated solid residue with water to solubilize the phosphate species and insolubilize the soluble lead species.

* * * * *